Nov. 14, 1950 — C. S. CARLSON — 2,530,325
AZEOTROPIC DISTILLATION OF MESITYLENE FROM ISOPHORONE
Filed Aug. 11, 1949
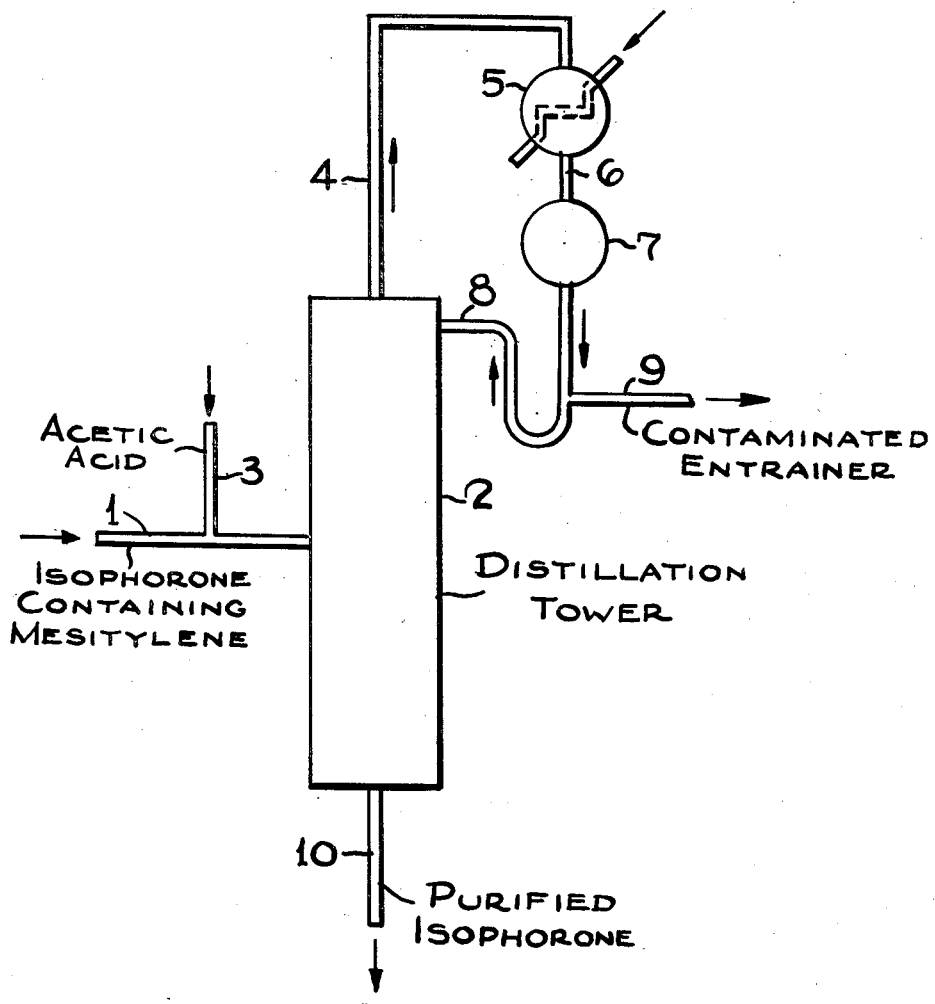
Carl S. Carlson Inventor
By Henry Berk Attorney Patented Nov. 14, 1950

2,530,325

UNITED STATES PATENT OFFICE 2,530,325

AZEOTROPIC DISTILLATION OF MESITYLENE FROM ISOPHORONE

Carl S. Carlson, Roselle, N. J., assignor to Standard Oil Development Company, a corporation of Delaware Application August 11, 1949, Serial No. 109,661

6 Claims. (Cl. 202—42)

This invention relates to the separation of isophorone in relatively pure form from mixtures thereof with mesitylene.

Isophorone is a solvent of increasing utility and is used among other things for the extraction and purification of oils, resins, and fatty acids. Commercial isophorone, which is made by the condensation of acetone, contains mesitylene (1,3,5-trimethyl benzene) as an impurity. The amount of mesitylene impurity present may be quite small, such as even only traces, but is still sufficient to cause undesirable contamination of products it is desired to obtain by isophorone treatment. Thus, for example, when isophorone containing only about 0.02% mesitylene was employed to extract acetic acid from aqueous solution, the acetic acid product contained 1% mesitylene, an undesirably high figure.

The present invention provides a method for obtaining isophorone substantially free of mesitylene by fractional distillation. The improved method comprises the separation of the mesitylene from its isophorone mixture by distillation in the presence of a substantially anhydrous $C_2$ to $C_4$ fatty acid, and preferably and most advantageously, acetic acid.

It has now been found that acetic acid forms an azeotrope with mesitylene. The boiling point of the mesitylene acetic acid azeotrope at atmospheric pressure is 118° C. and the azeotrope contains 3.6 vol. percent of hydrocarbon. Mesitylene itself boils at 164.6° C. and isophorone boils at 215.2° C.

Substantially anhydrous $C_3$ to $C_5$ fatty acids may also be employed to remove mesitylene from isophorone by azeotropic distillation. The data on these azeotropes is listed below in Table I.

Table I

| Organic Acid | Acid, B. Pt. °C. | Weight Per Cent Hydrocarbon in Azeotrope | Azeotrope, B. Pt. °C. |
|---|---|---|---|
| n-Propionic | 140.7 | 23 | 139.3 |
| n-Butyric | 163.5 | 43 | 158.5 |
| iso-Butyric | 154.5 | 48 | 148.5 |
| iso-Pentanoic (iso-valeric) | 176.5 | 81 | 162.8 |

It is preferable, however, to employ acetic acid for the removal of the mesitylene as the azeotrope of the latter with acetic acid exhibits the greatest temperature differential from the boiling point of isophorone. This temperature differential permits of the use of a lesser number of plates in the fractionation column and reduced reflux ratio requirements. This is especially practicable where the mesitylene occurs in small quantities as in the typical commercial isophorone. Mixtures of individual $C_2$ to $C_5$ acids can also be employed.

It is desirable that the $C_2$ to $C_5$ acids utilized be substantially anhydrous to prevent the formation of isophorone water azeotropes which boil at temperatures below 118° C. In general, therefore, the maximum water content of the acids should be less than 5%.

It is to be understood that the term "substantially anhydrous acid" as used herein refers to acids having water contents of less than 5%, and preferably 1% or less.

If water is present in the fatty acids used to purify the isophorone, an isophorone water azeotrope is encountered in the distillation. This azeotrope boils at 98° C. The azeotropic mixture on condensation separates into an organic layer and a water layer permitting of reuse of the isophorone. However, since this vaporization of the isophorone would entail additional heat and equipment requirements, it is preferable to employ fatty acids having minimum quantities of water as explained above.

This invention will be better understood by reference to the flow diagram shown in the drawing.

In the system shown, the mixture containing isophorone and mesitylene is fed through line 1 into distillation tower 2. Substantially anhydrous acetic acid to be used as the entrainer is added to tower 2 through lines 3 and 1. The acetic acid mesitylene azeotrope is taken overhead through line 4 at a temperature of 118° C., cooled and condensed in condenser 5 and passed to drum 7 through line 6. A portion of the acetic acid mesitylene solution is returned as reflux through line 8 and the remaining portion of the acetic acid mesitylene solution is withdrawn through line 9 and can be discarded or employed elsewhere as indicated below. Purified isophorone is withdrawn through line 10 from tower 2.

The amount of $C_2$ to $C_5$ fatty acid required in the process of this invention is readily calculated from the compositions of the azeotropes given above. Sufficient acid should be provided to effect the complete removal of the mesitylene in the form of the azeotropic mixture. The desired amount of acid may be added as such or in the vapor phase to promote the distillation. Usually it is preferable that the acid added to assist in removing the mesitylene be limited to an amount which is not substantially greater than that necessary to remove all the mesitylene since any acid in excess of the amount necessary to form the constant boiling mixture will have to be distilled with the azeotrope, resulting in an extra heat load on the column with no additional gain in product purity.

The mesitylene acetic acid azeotrope, on condensation, yields a homogeneous system. The condensate can be washed with water and the acetic acid removed in the water phase. This aqueous acetic acid can be reemployed as feed for a fatty acid extraction process.

The improved method of separating mesitylene from mixtures thereof with isophorone and the advantages derived from the use of this invention, is illustrated in the following examples of batch distillation.

*Example I*

A quantity of isophorone containing 2 vol. per cent of mesitylene was distilled in the presence of substantially anhydrous acetic acid. The latter was present in an amount in excess of that necessary to form the azeotrope. An isophorone mesitylene azeotrope was taken overhead indicating the existence of the latter.

*Example II*

The purified isophorone from Example I was contacted with additional substantially anhydrous acetic acid (glacial) and the mixture was distilled again. No azeotrope was gotten indicating that the mesitylene had been completely removed.

*Example III*

One volume of glacial acetic acid was distilled in a mixture with two volumes of isophorone, the latter containing 0.04% mesitylene. The bottoms isophorone product contained no mesitylene. This example indicates how even small quantities of mesitylene are removed by the process of this invention.

*Example IV*

A mixture of 500 c. c. of isophorone, 25 c. c. of mesitylene and 100 c. c. of anhydrous n-butyric acid was distilled. The mesitylene was completely removed in the first 75 c. c. of distillate.

*Example V*

Three volumes of substantially anhydrous acetic acid and one volume of mesitylene were distilled in a 50 plate (glass helices) column. The azeotropic distillate was condensed and divided into three fractions. These were diluted with water and 3.67 vol. per cent of insoluble mesitylene based on acetic acid was obtained. This confirms the composition of the azeotrope given above.

Batch or continuous operation may be employed in the process of this invention.

This invention has been described with respect to specific embodiments but is not intended to be limited thereby.

What is claimed is:

1. A process for purifying isophorone in mixtures containing both isophorone and mesitylene which comprises fractionally distilling the mixture in the presence of a substantially anhydrous $C_2$ to $C_5$ fatty acid that forms an azeotrope with mesitylene.

2. A process for purifying isophorone in mixtures containing both isophorone and mesitylene which comprises fractionally distilling the mixture in the presence of substantially anhydrous acetic acid.

3. A process for purifying isophorone in a mixture containing isophorone and mesitylene which comprises adding a substantially anhydrous $C_2$ to $C_5$ fatty acid that forms an azeotrope with mesitylene to the mixture, and distilling off the mesitylene as an azeotrope with the fatty acid.

4. A process for purifying isophorone in mixtures containing isophorone and mesitylene which comprises adding substantially anhydrous acetic acid to the mixture and distilling off the mesitylene as an azeotrope with the acetic acid.

5. A process for separating mesitylene from mixtures containing both mesitylene and isophorone which comprises subjecting the mixture to fractional distillation in the presence of acetic acid at a temperature of 118° C., distilling off a constant boiling fraction comprising mesitylene and acetic acid, cooling and condensing this fraction, and returning a portion of the resulting condensate to the fractional distillation.

6. A process as in claim 4 in which the acetic acid added to the mixture is in a ratio of about 27:1 by volume based on mesitylene.

CARL S. CARLSON.

REFERENCES CITED

The following references are of record in the file of this patent:

UNITED STATES PATENTS

| Number | Name | Date |
|---|---|---|
| 2,279,780 | Engel | Apr. 14, 1942 |
| 2,380,019 | Bloomer | July 10, 1945 |